United States Patent
Ishii et al.

(10) Patent No.: US 9,728,340 B2
(45) Date of Patent: *Aug. 8, 2017

(54) VARIABLE CAPACITANCE CAPACITOR ELEMENT

(71) Applicant: TAIYO YUDEN CO., LTD., Tokyo (JP)

(72) Inventors: Daiki Ishii, Tokyo (JP); Tomokazu Ikenaga, Tokyo (JP); Kentaro Nakamura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 13/915,117

(22) Filed: Jun. 11, 2013

(65) Prior Publication Data

US 2013/0328735 A1    Dec. 12, 2013

(30) Foreign Application Priority Data

Jun. 12, 2012   (JP) ................. 2012-132595

(51) Int. Cl.
    *H01G 7/06*      (2006.01)
    *H01Q 7/00*      (2006.01)
    (Continued)

(52) U.S. Cl.
    CPC ........... *H01G 7/06* (2013.01); *G06K 19/0726* (2013.01); *G06K 19/0727* (2013.01);
    (Continued)

(58) Field of Classification Search
    CPC ....... H01L 27/108; H01L 29/76; H01L 29/94; H01L 31/19; H01L 21/20; H01G 7/00;
    (Continued)

(56) References Cited

U.S. PATENT DOCUMENTS 6,529,169 B2 *   3/2003   Justice ..................... 343/788
6,674,321 B1 *   1/2004   York ...................... H01G 7/06
                                                             327/334

(Continued)

FOREIGN PATENT DOCUMENTS

JP      H10-256085      9/1998
JP      2006-049840 A      2/2006

(Continued)

OTHER PUBLICATIONS

Balachandran et al. "Dielectric Characteristics of Barium Strontium Titanate Based Metal Insulator Metal Capacitor for Dynamic Random Access Memory Cell , Int. J. Electrochem Sci., 7 (2012) 11895-11903".*

(Continued)

*Primary Examiner* — Jessica Han
*Assistant Examiner* — Bamidele A Jegede
(74) *Attorney, Agent, or Firm* — Pillsbury Winthrop Shaw Pittman, LLP

(57) ABSTRACT

A variable capacitance capacitor element according to an embodiment of the present invention comprises: a supporting substrate; a first electrode layer provided on the supporting substrate; a second electrode layer provided opposite to the first electrode layer; and a dielectric layer positioned between the first electrode layer and the second electrode layer. In accordance with an aspect, a main component of the dielectric layer is represented by a composition formula $Ba_{1-x}Sr_xTiO_3$ ($0.5 \leq x \leq 0.8$), and the first thin film dielectric layer has a thickness of 200 nm or smaller.

5 Claims, 5 Drawing Sheets

(51) Int. Cl.
  *G06K 19/07* (2006.01)
  *B82Y 99/00* (2011.01)
(52) U.S. Cl.
  CPC .............. *H01Q 7/005* (2013.01); *B82Y 99/00* (2013.01); *Y10S 977/948* (2013.01)
(58) Field of Classification Search
  CPC .. H01G 4/06; H01G 7/06; H05K 3/10; H01Q 7/005; H01Q 7/08; G06K 19/0726; G06K 19/0727; B82Y 99/00; Y10S 977/948
  USPC ....... 343/788, 745, 787, 867, 741, 742, 748; 25/310
  See application file for complete search history.

(56) References Cited

U.S. PATENT DOCUMENTS

| | | | |
|---|---|---|---|
| 6,806,553 B2* | 10/2004 | Yashima et al. | 257/532 |
| 2003/0071300 A1* | 4/2003 | Yashima et al. | 257/310 |
| 2008/0010798 A1* | 1/2008 | Borland et al. | 29/25.42 |
| 2010/0178878 A1 | 7/2010 | Kurioka | |

FOREIGN PATENT DOCUMENTS

| | | |
|---|---|---|
| JP | 2006-303389 | 11/2006 |
| JP | 2007-123494 | 5/2007 |
| JP | 2009200748 A | 9/2009 |
| JP | 2010055570 A | 3/2010 |
| JP | 2011-073607 A | 4/2011 |
| JP | 2011119482 A | 6/2011 |
| JP | 2012-209749 | 10/2012 |
| WO | 2008/149622 A1 | 12/2008 |

OTHER PUBLICATIONS

Sriraj Manavalan, Graduate Theses and Dissertations, "Structural and electrical properties of barium strontium titanate thin films for tunable microwave applications, University of South Florida, 2005".*

Bunting et al. "Properties of Barium-Strontium Titanate Dielectrics, Journal of Research of the National Bureau of Standards, Research Paper RP 1776, vol. 38, Mar. 1947".*

Japanese Office Action dated Jan. 21, 2014 of corresponding Japanese Patent Application No. 2012-132595 (9 pages including English translation).

Final Japanese Office Action dated Apr. 1, 2014 of Japanese Patent Application No. 2012-132595, including English translation thereof (4 pages).

Japanese Trial Decision dated Mar. 24, 2015 for Appln. No. 2012-132595.

Japanese Rejection Decision dated Dec. 13, 2016 for Application No. 2014-131001.

Japanese Office Action dated Mar. 29, 2016 for Appln. No. 2014-131001.

* cited by examiner

VARIABLE CAPACITANCE CAPACITOR ELEMENT

CROSS-REFERENCE TO RELATED APPLICATIONS

This application is based on and claims the benefit of priority from Japanese Patent Application Serial No. 2012-132595 (filed on Jun. 12, 2012), the contents of which are hereby incorporated by reference in their entirety.

TECHNICAL FIELD

The present invention relates to a variable capacitance capacitor element, in particular, to a thin film variable capacitance capacitor element for use with a NFC-compliant resonance circuit.

BACKGROUND

Near Field Communication (NFC) is one of the wireless communication systems operating in a frequency range around 13 MHz for a short range within 10 cm between electromagnetically-coupled circuits each having an antenna coil. An NFC-compliant circuit can be installed in various media, for example, electronic instruments such as cards, tags, and mobile phones.

Typically, an NFC-compliant circuit includes an antenna circuit having an antenna coil, and an IC chip. An operating voltage for the IC chip is supplied from a built-in battery. The IC chip includes a memory device and a CPU. The memory device is configured to store a chip-specific ID number and various transmission/receipt data, and the CPU is configured to control transmission and reception of signals and writing and reading of data. A card equipped with such an IC chip is sometimes called a contactless IC card since it is capable of transmitting and receiving data without contact with a reader/writer device located at a short distance.

An IC chip in a contactless IC card is supplied with an operating voltage by output from the antenna circuit. More specifically, the antenna circuit includes an antenna coil and a capacitor resonating therewith and operates efficiently at its resonance frequency. This resonance frequency is set to 13.56 MHz, which is equal to the frequency of a carrier wave transmitted from the reader/writer device. When the contactless IC card is held close to a reader/writer device, the carrier wave is received by the antenna circuit and the power of the received carrier wave is rectified to supply an operation voltage to the IC chip. Thus, no operation voltage is required from a power supply such as a battery to perform processes such as data transmission/reception to and from the reader/writer device. Accordingly, the resonance frequency of the resonance circuit must be properly adjusted to the frequency of the carrier wave to supply a stable operation voltage to the IC chip. Meanwhile, when the IC chip of a contactless IC card is installed on an electronic instrument equipped with a battery such as a mobile phone, the IC chip is supplied with power from the battery of the electronic instrument. In this case, the resonance frequency of the resonance circuit still must be properly adjusted to the frequency of the carrier wave to enhance the sensitivity of the transmission to and reception from the reader/writer device.

However, in actual manufacturing processes, electric characteristics of the antenna coil and the capacitor can be varied from their designed values and circuit elements can be displaced from the right positions, which can cause the resonance frequency to be off the designed value of 13.56 MHz. Accordingly, the resonance frequency must be adjusted to the carrier wave frequency after manufacturing.

There are known techniques for adjusting the resonance frequency after manufacturing. For example, Japanese Patent Application Publication No. 2009-200748 discloses an antenna device for use in a contactless IC card, wherein a part of wires connecting the reactive elements of the resonance circuit is cut with laser to adjust the resonance frequency of the resonance circuit discretely.

Additionally, the Applicant has proposed a resonance circuit that includes a variable capacitance capacitor element configured to vary its capacitance with a bias voltage, thereby to adjust the resonance frequency without any mechanical alteration to the wiring pattern (see Japanese Patent Application No. 2011-073607).

There are various known variable capacitance capacitor elements. For example, Japanese Patent Application Publication Nos. 2011-119482 and 2010-055570 disclose variable capacitance capacitors composed of a plurality of dielectric layers and electrode layers stacked together. Japanese Patent Application Publication No. 2006-303389 discloses a thin film variable capacitance capacitor element wherein electrode layers and dielectric layers are thin films.

In adjusting a resonance frequency by using a variable capacitance capacitor element, a bias voltage corresponding to the desired amount of variation of the resonance frequency is determined and applied, based on the capacitance variation characteristics representing the relationship between a DC bias voltage applied to the variable capacitance capacitor element and a capacitance of the variable capacitance capacitor element (see, for example, FIG. 11(*b*) of Japanese Patent Application Publication No. 2010-055570). The variation characteristics of the capacitance with respect to the bias voltage are different depending on the materials of the dielectrics constituting the variable capacitance capacitor. To adjust the resonance frequency over a sufficiently wide frequency region, it is preferable to use a dielectric material that provides high variation rate of capacitance with respect to the applied bias voltage.

However, when a DC bias voltage is continuously applied to a variable capacitance capacitor element, the capacitance of the variable capacitance capacitor gradually decreases with time. This phenomenon is called DC aging. In DC aging, the capacitance of the variable capacitance capacitor is shifted from the value determined from the capacitance variation characteristics; as a result, the resonance frequency cannot be adjusted accurately.

SUMMARY

Therefore, there is a high demand for a variable capacitance capacitor element wherein the capacitance is largely varied by application of a DC bias voltage, and the time variation of the capacitance is small when the DC bias voltage is continuously applied. An object of the present invention is to provide such a variable capacitance capacitor according to the various embodiments. Other objects of the present invention will be understood from the description made herein and the attached drawings.

A variable capacitance capacitor element according to an embodiment of the present invention comprises: a supporting substrate; a first electrode layer provided on the supporting substrate; a second electrode layer provided opposite to the first electrode layer; and a first thin film dielectric layer positioned between the first electrode layer and the second electrode layer. In accordance with an aspect, a main component of the first thin film dielectric layer is represented by a composition formula $Ba_{1-x}Sr_xTiO_3$ (0.5≤x≤0.8), and the first thin film dielectric layer has a thickness of 200 nm or smaller.

Various embodiments of the present invention provide a variable capacitance capacitor element wherein the capacitance is largely varied by application of a DC bias voltage, and the time variation of the capacitance is small when the DC bias voltage is continuously applied.

DESCRIPTION OF EXAMPLE EMBODIMENTS

Various embodiments of the present invention will now be described with reference to the attached drawings. In the embodiments, the same components are denoted by the same reference signs, and the detailed description of the same components will be appropriately omitted. It should be noted that the drawings do not necessarily appear in accurate scales for convenience of description.

Figure 1:
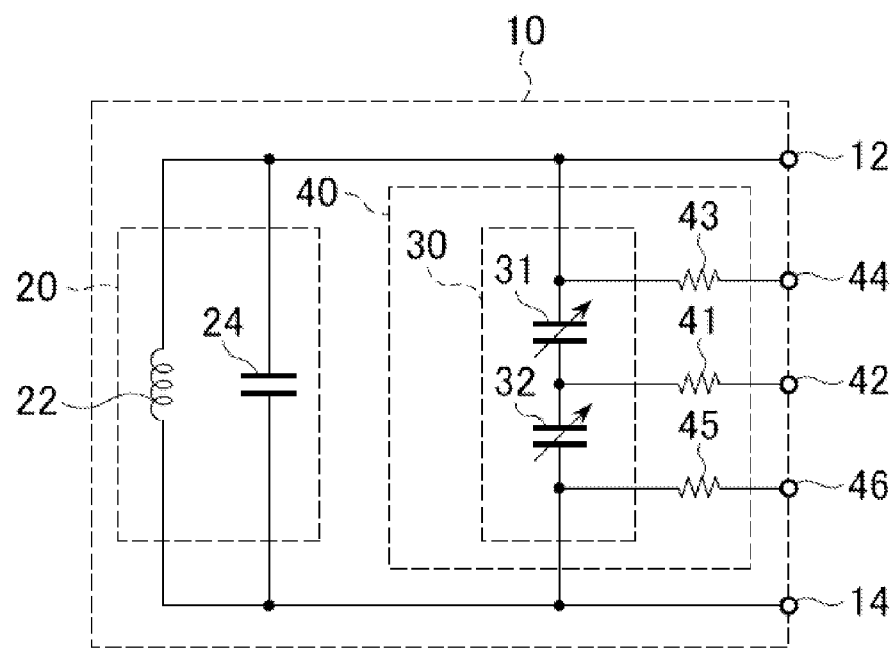
FIG. 1 is a circuit diagram showing a resonance circuit including a variable capacitance capacitor according to an embodiment of the present invention.

FIG. 1 is a circuit diagram showing a resonance circuit 10 including a variable capacitance capacitor according to an embodiment of the present invention. The resonance circuit 10 according to an embodiment may be electrically connected to an IC (not shown) and may be installed on an electronic instrument such as a mobile phone along with the IC.

The resonance circuit 10 may comprise an antenna circuit 20 and a frequency adjusting circuit 40 and have a certain resonance frequency. When the resonance circuit 10 is embedded in an NFC-compliant chip, the antenna circuit 20 and the frequency adjusting circuit 40 may be configured such that the resonance frequency is 13.56 MHz, that is, the frequency used in NFC which is designated by ISO 18092, etc.

The antenna circuit 20 may comprise an antenna coil 22 and a capacitor 24 arranged in parallel between a connecting terminal 12 and a connecting terminal 14. In an embodiment, a carrier wave of 13.56 MHz transmitted from a reader/writer device (not shown) may be received via the antenna coil 22 electromagnetically coupled to an antenna coil of the reader/writer device, and the received signal may be inputted through the connecting terminals 12 and 14 into a subsequent IC (not shown).

In an embodiment, the frequency adjusting circuit 40 may comprise a variable capacitance capacitor 30 including two variable capacitance capacitors 31 and 32 connected in series, and three DC-removing resistances 41, 43, and 45. In accordance with an aspect, the variable capacitance capacitor 31 may be positioned between a power supply connecting terminal 42 to which the resistance 41 is connected in series and an earth connecting terminal 44 to which the resistance 43 is connected; and the variable capacitance capacitor 32 may be positioned between the power supply connecting terminal 42 to which the resistance 41 is connected in series and an earth connecting terminal 46 to which the resistance 45 is connected. The variable capacitance capacitors 31 and 32 may be configured to have capacitances that vary in accordance with a DC bias voltage applied across the power supply connecting terminal 42, the earth connecting terminal 44, and the earth connecting terminal 46. The capacitances of the variable capacitance capacitors 31 and 32 can be varied to adjust the resonance frequency of the resonance circuit 10 even after the manufacture of the resonance circuit 10. The applied bias voltage may be ordinarily set in a range between 0 to 3 V when the resonance circuit 10 is installed on a mobile phone. FIG. 1 shows an example wherein the DC-removing resistances 41, 43, and 45 are provided outside the variable capacitance capacitor circuit 30. However, the present invention is not limited to such a configuration. The variable capacitance capacitor circuit 30 may include the DC-removing resistances 41, 43, and 45.

Figure 2:
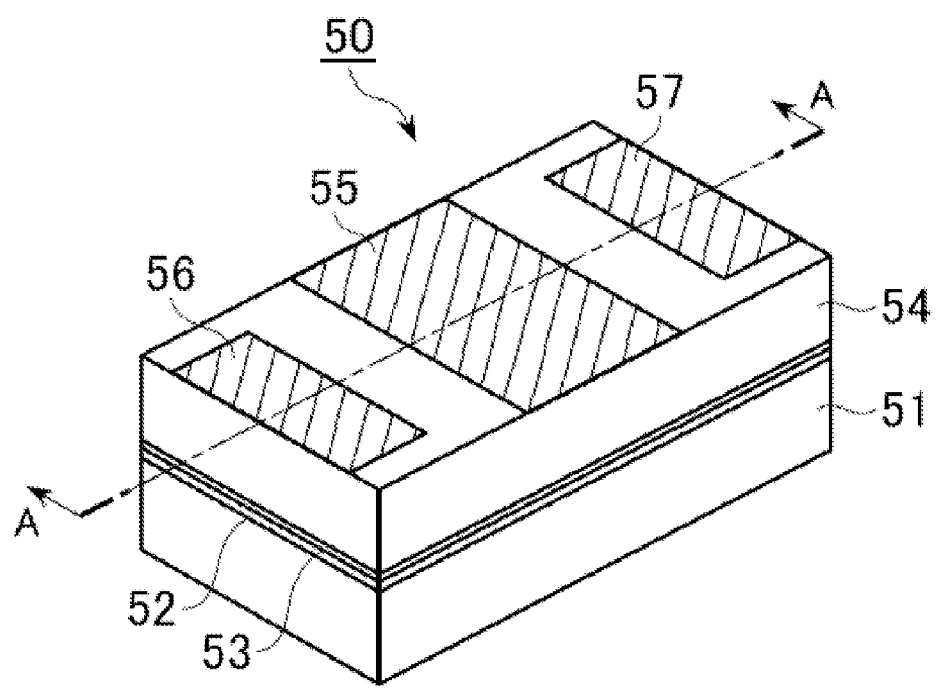
FIG. 2 is a schematic diagram showing a variable capacitance capacitor according to an embodiment of the present invention.
Figure 3:
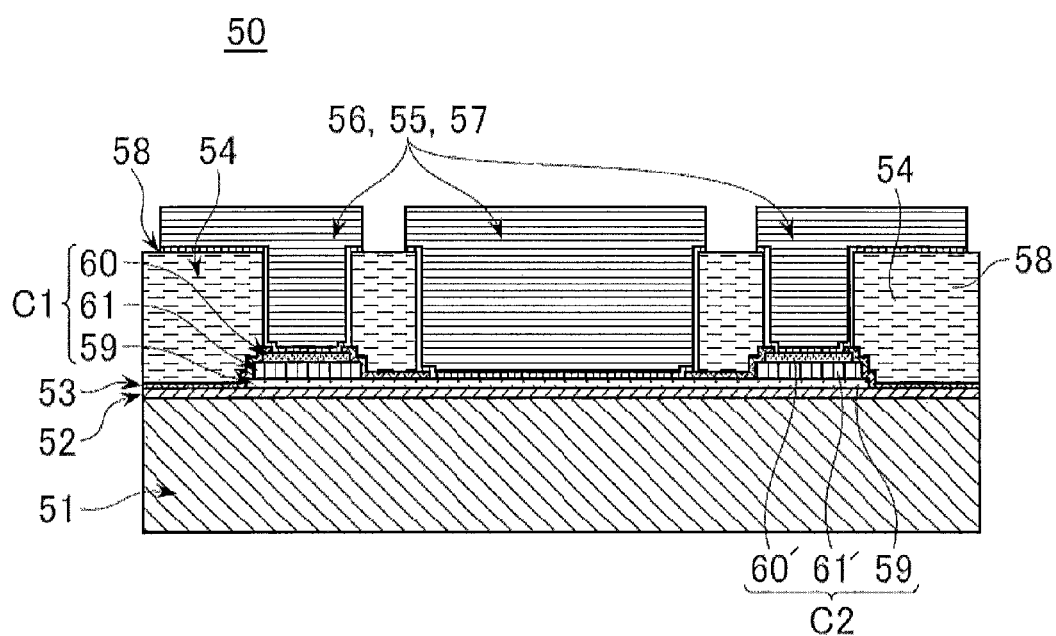
FIG. 3 shows an A-A sectional view of the variable capacitance capacitor shown in FIG. 2.

FIGS. 2 and 3 schematically show the structure of the variable capacitance capacitor element 50 according to an embodiment of the present invention. The variable capacitance capacitor element 50 corresponds to the variable capacitance capacitor circuit 30 shown in FIG. 1. As shown, the variable capacitance capacitor element 50 may be composed of a supporting substrate 51, a first insulating layer 52 formed on the supporting substrate 51, a second insulating layer 53 formed on the first insulating layer 52, and a third insulating layer 54 formed on the second insulating layer 53. The third insulating layer 54 may have a plurality of through holes formed therein (FIG. 3 shows three through holes). Formed on the top surface of the third insulating layer 54 and the inner circumferential surfaces of the through holes in the third insulating layer 54 may be seed layers 58; and formed on the seed layers 58 by electroless plating or the like may be terminal electrodes 55, 56, and 57.

Provided between the lower end of the terminal electrode 56 and the second insulating layer 53 may be a capacitance generating portion C1 having metal-insulator-metal (MIM) structure wherein a lower electrode layer 59 (a first electrode layer), a thin film dielectric layer 61 (a first thin film dielectric layer), and an upper electrode layer 60 (a second electrode layer) are stacked in this order on the supporting substrate 51. Likewise, provided between the lower end of the terminal electrode 57 and the second insulating layer 52 may be a capacitance generating portion C2 wherein a lower electrode layer 59 (a first electrode layer), a thin film dielectric layer 61' (a second thin film dielectric layer), and an upper electrode layer 60' (a third electrode layer) are stacked in this order on the supporting substrate 51. The terminal electrodes 55, 56, and 57 may correspond to the power supply connecting terminal 42, the earth connecting terminal 44, and the earth connecting terminal 46 shown in FIG. 1, respectively. The capacitance generating portion C1 may correspond to the variable capacitance capacitor 31; the capacitance generating portion C2 may correspond to the variable capacitance capacitor 32.

The supporting substrate 51 may be composed of Si for example. The supporting substrate 51 may be formed of any material, for example, an insulating material such as quartz, alumina, sapphire, or glass, or a conductive material such as Si. When the supporting substrate is a conductive supporting substrate, the supporting substrate 51 may be preferably a high resistance supporting substrate. The first insulating layer 52 formed on the supporting substrate 51 may be, for example, a thermally-oxidized film of $SiO_2$.

The second insulating layer 53 may be made by, for example, forming a film of $Al_2O_3$ on the surface of the first insulating layer 52. The second insulating layer 53 may be formed of any insulating material and may be, for example, a single layer made by forming a film of $Al_2O_3$, SiN, $Ta_2O_5$, or $SrTiO_3$. The second insulating layer 53 may also be formed by stacking these single layers.

The third insulating layer 54 may be made by, for example, forming a film of polyimide on the second insulating layer 53. The third insulating layer 54 may be any inorganic insulating film made of, for example, $SiO_2$ and SiN or any organic insulating film made of, for example, a polyimide resin and a BCB resin.

The seed layer 58 may be, for example, a TaN/Ta layer. The TaN/Ta layer may be formed by, for example, sputtering method, wherein TaN is first deposited on the third insulating layer 54, followed by Ta deposited on the TaN layer. TaN may be replaced with various materials, for example, a nitride such as TiN, TaN, TiSiN, and TaSiN or an oxide such as $SrRuO_3$ and $IrO_2$.

The terminal electrodes 55, 56, and 57 may be formed of any conductive material such as Cu, Ni, Co, Cr, Ag, Au, Pd, Fe, Sn, and Pt or alloys thereof. The terminal electrodes 55, 56, and 57 may be formed by separating out these metals or alloys onto the seed layer 58 by, for example, electrolytic plating.

The lower electrode layer 59 and the upper electrode layer 60 of the capacitance generating portion C1 may be formed of various electrode materials, for example, noble metals such as Pt, Ir, and Ru or conductive oxides such as $SrRuO_3$, $RuO_2$, and $IrO_2$. The lower electrode layer 59 may be formed on the surface of the first insulating layer 52 by, for example, sputtering method. The lower electrode layer 59 may be either formed directly on the surface of the first insulating layer 52 or formed on an adhesion layer of Ti or $TiO_2$ formed on the surface of the first insulating layer 52.

Formed on the top surface of the lower electrode layer 59 may be a thin film dielectric layer 61; this layer may be formed by a thin film deposition method such as sputtering, CVD, and pulse laser deposition that grows a crystal from the substrate. The thin film dielectric layer 61 obtained by growing a crystal from the substrate may be more susceptible to impact of substrate constraint than a bulk crystal; therefore, temperature characteristics may be improved. Therefore, the thin film dielectric layer 61 may also be formed by growing a crystal from the substrate by CSD or sol-gel method, in addition to the above methods. In one embodiment, the thin film dielectric layer 61 may be formed of a ceramic composition represented by a composition formula $Ba_{1-x}Sr_xTiO_3$ ($0.5 \leq x \leq 0.8$). The thin film dielectric layer 61 may be formed to a thickness of 200 nm or smaller, more preferably, from 60 nm to 150 nm. Further, the thin film dielectric layer 61 may include Mn and Nb as additives. The Inventors confirmed that adding one or both of Mn and Nb further increases the reliability. Also, Mn improves the adhesion and Nb improves moisture resistance. The amount of additives may be preferably 10 at % or smaller relative to Ti.

Formed on the top surface of the thin film dielectric layer 61 may be an upper electrode layer 60; this layer may be formed of the same material by the same method as the lower electrode layer 59. Firing the laminated body having such a structure at a certain temperature may provide a variable capacitance capacitor element according to an embodiment of the present invention.

Figure 4:
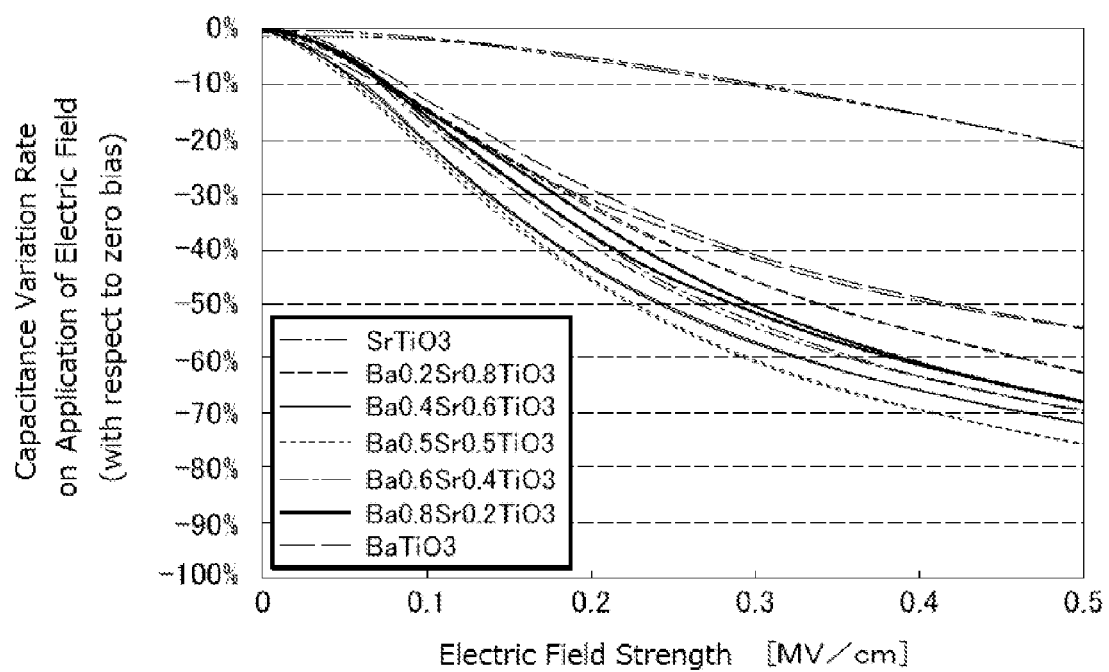
FIG. 4 is a graph showing the relationship between a DC bias voltage applied to the variable capacitance capacitor and the variation rate of the capacitance.

The ceramic composition represented by the composition formula $Ba_{1-x}Sr_xTiO_3$ may have capacitance variation characteristics that varies in accordance with the content ratio of Ba to Sr when a DC bias voltage is applied. An example of such variation characteristics is shown in FIG. 4. FIG. 4 is a graph showing measurement results of variation of capacitance relative to applied DC bias voltage in samples having the same structure as the variable capacitance capacitor element 50 shown in FIG. 3. As the variable capacitance capacitor element 50 shown in FIG. 3, these samples were made by stacking, on a supporting substrate 51 of Si, a lower electrode layer 59 of Pt with a thickness of 100 nm, a thin film dielectric layer 61 of which a main component is represented by the composition formula $Ba_{1-x}Sr_xTiO_3$, and an upper electrode layer 60 of Pt with a thickness of 100 nm, arranged in this order.

The thin film dielectric layer 61 was obtained by sputtering method under a condition of a film-forming temperature of 600° C., a flow ratio of Ar to $O_2$ of 1:1, and a film-forming pressure of 0.1 Pa, wherein an RF power of 150 W is applied for deposition to a thickness of 150 nm on the lower electrode layer 59. The thin film dielectric layer 61, of which a main component is represented by the composition formula $Ba_{1-x}Sr_xTiO_3$, was prepared in seven types wherein x=0, 0.2, 0.4, 0.5, 0.6, 0.8, 1.0, respectively; and each type was included in a variable capacitance capacitor element. FIG. 4 shows measurement results of capacitance variation characteristics in these seven types of variable capacitance capacitor elements.

The x-coordinate of FIG. 4 indicates DC bias voltages applied across the lower electrode layer 59 and the upper electrode layer 60, in terms of electric field strength (MV/cm). The y-coordinate indicates the variation rate of capacitance (also herein referred to simply as "capacitance variation rate") of variable capacitance capacitors with respect to the capacitance measured when a DC bias voltage is not applied. More specifically, the y-coordinate indicates the value represented by Formula 1 below as a capacitance variation rate; this value is measured when a DC bias voltage is applied under a condition of OSC level 100 mV, 10 kHz with electric field strength of 0 MV/cm to 0.5 MV/cm.

$$(CP1-CP2)/CP2 \qquad \text{(Formula 1)}$$

CP1: capacitance measured when a DC bias voltage is applied
CP2: capacitance measured when a DC bias voltage is not applied FIG. 4 indicates that the capacitance variation rate of the prepared variable capacitance capacitors is peaked where x ranges from 0.2 to 0.6.

Figure 5:
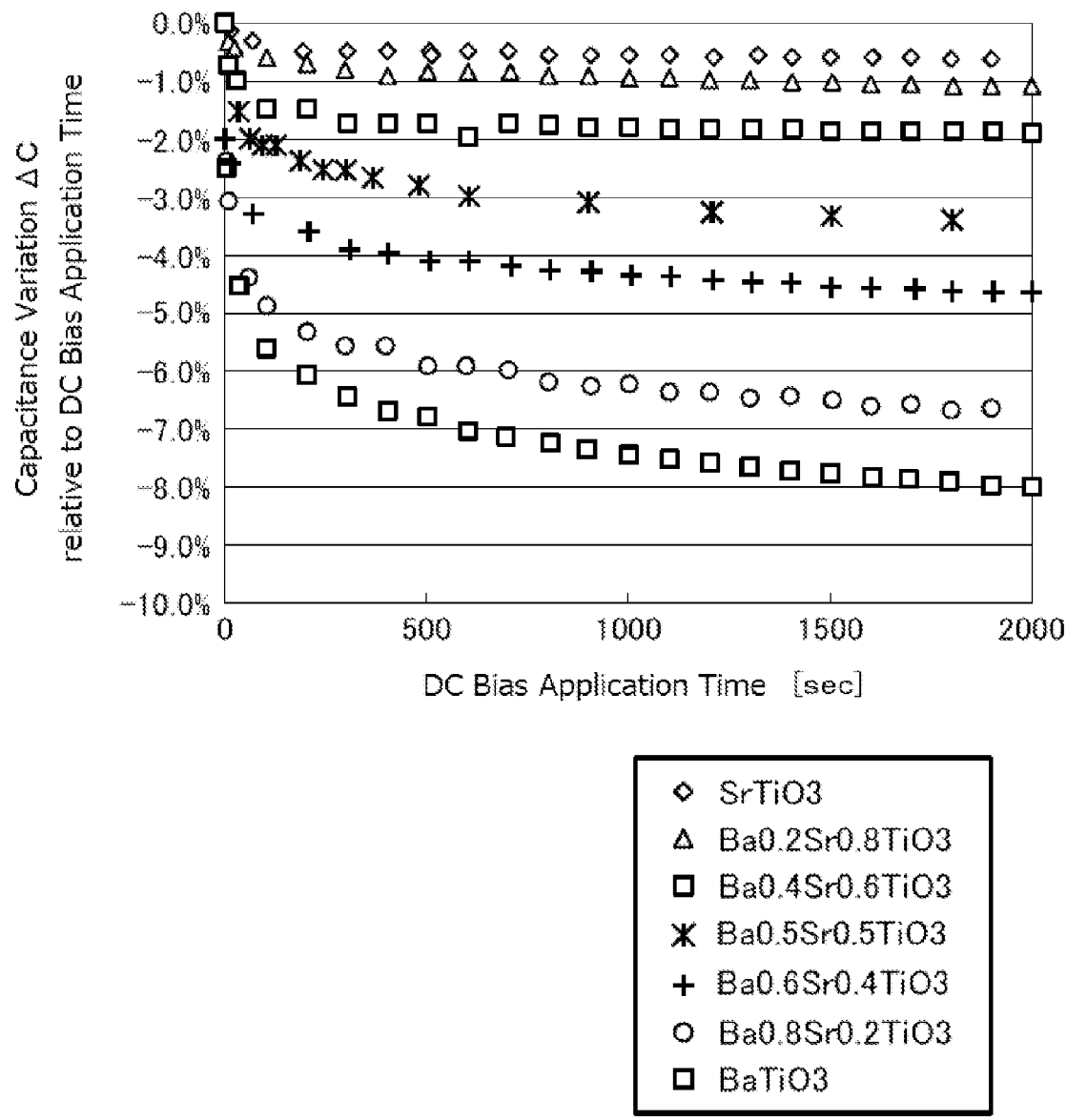
FIG. 5 is a graph showing the relationship between the application time of a constant DC bias voltage and the variation rate of the capacitance.

Subsequently, a constant DC bias voltage was applied to the above seven types of variable capacitance capacitor elements continuously for 2,000 seconds, while measuring the variation of the capacitance. FIG. 5 shows the variation of capacitance of the above seven types of variable capacitance capacitors continuously subjected to a DC bias voltage of 1.0 MV/cm for 2,000 seconds. The x-coordinate of FIG. 5 indicates the application time of a bias voltage in seconds, and the y-coordinate indicates the variation rates of capacitance of variable capacitance capacitors with respect to the capacitance measured when the application of the DC bias voltage is started.

As shown in FIG. 5, a higher content ratio of Ba (i.e., smaller x in the composition formula of the main component of the dielectric layer) may produce a greater variation rate of capacitance measured when the DC bias voltage is applied for a designated time.

In an NFC-compliant resonance circuit, it is generally preferable that the resonance frequency can be adjusted in the unit of 100 kHz over the range of 700 kHz in the frequency region around 13.56 MHz. To adjust the resonance frequency over the range of 700 kHz in the resonance circuit 10 shown in FIG. 1, the capacitances of the variable capacitance capacitors 31 and 32 should preferably be largely varied when a designated DC bias voltage is applied. In the resonance circuit 10 shown in FIG. 1, the resonance frequency can be adjusted over the range of 700 kHz using a DC bias voltage of 3 V that is available in many electronic instruments, if the capacitance of the variable capacitance capacitor circuit 30 (the combined capacitance of the variable capacitance capacitors 31 and 32) is varied by 33% or more. The measurement results shown in FIG. 4 indicates that a dielectric layer of the composition formula $Ba_{1-x}Sr_xTiO_3$ may provide a capacitance variation rate of 33% or higher when the thickness of the dielectric layer is 150 nm or smaller and $0.2 \leq x < 0.8$. Additionally, in the case where $x=0.5$, the capacitance variation rate is 33% or higher even if the thickness of the dielectric layer is 200 nm or smaller.

Meanwhile, to adjust the resonance frequency in the unit of 100 kHz, the variation of the resonance frequency caused by the capacitance variation produced when a DC bias voltage is continuously applied must be smaller than 100 kHz. In the resonance circuit 10 shown in FIG. 1, when the capacitance of the variable capacitance capacitor circuit 30 (the combined capacitance of the variable capacitance capacitors 31 and 32) is varied by 4% or more, the resonance frequency may be varied by 100 kHz or more. Additionally, the variation rate of capacitance measured when a DC bias voltage is continuously applied may be varied more significantly as the electric field strength is higher. When a DC bias voltage of 3 V that is available in many electronic instruments is used, the thickness of the dielectric layer subjected to an electric field strength of 1.0 MV/cm or lower may be 30 nm or larger. The measurement results shown in FIG. 5 indicates that a dielectric layer of the composition formula $Ba_{1-x}Sr_xTiO_3$ may provide a capacitance variation rate of 4% or lower in the variable capacitance capacitor circuit 30 when $0.5 \leq x$ and the thickness of the dielectric layer is 30 nm or larger.

Accordingly, when the main component of the thin film dielectric layer 61 of the capacitance generating portions C1 and C2 in a variable capacitance capacitor element 50 is a ceramic composition represented by the composition formula $Ba_{1-x}Sr_xTiO_3$ ($0.5 \leq x \leq 0.8$), application of a DC bias voltage may largely vary the capacitance of the variable capacitance capacitor element 50, and time variation of the capacitance may be small even when the DC bias voltage is continuously applied. This variable capacitance capacitor element 50, particularly used in an NFC-compliant resonance circuit, can adjust the resonance frequency in the unit of 100 kHz over the frequency region of 700 kHz.

The embodiments of the present invention are not limited to those explicitly described above, and are susceptible to various modifications. For example, the connection between the variable capacitance capacitors 31 and 32 may also be in parallel as well as in series. If the variable capacitance capacitors 31 and 32 are connected in parallel, the arrangement of the capacitance generating portions C1 and C2 and the terminal electrodes 55 to 57 shown in FIG. 3 may be modified such that the capacitance generating portions C1 and C2 are connected in parallel. Additionally, FIG. 3 shows an example wherein each of the capacitance generating portions C1 and C2 is composed of a single MIM structure; however, each of the capacitance generating portions C1 and C2 may also be composed of two or more MIM structures connected in series.

What is claimed is:

1. A variable capacitance capacitor element comprising:
   a supporting substrate;
   a first electrode layer provided on the supporting substrate;
   a second electrode layer provided opposite to the first electrode layer; and
   a first thin film dielectric layer positioned between the first and second electrode layers,
   wherein a main component of the first thin film dielectric layer is represented by a composition formula $Ba_{1-x}Sr_xTiO_3$ ($0.6 < x \leq 0.8$),
   wherein the first thin film dielectric layer has a thickness from 30 nm to 150 nm, and
   wherein the thickness of the first thin film dielectric layer is between 30 nm and 150 nm such that, upon application of a DC bias voltage of 3 Volts, an electric field strength in the variable capacitance capacitor element is 1.0 MV/cm or lower, and
   wherein, when the DC bias voltage is continuously applied to the variable capacitance capacitor element for a predetermined amount of time, a variation rate of capacitance of the variable capacitance capacitor element is 4% or lower due to the thickness of the first thin film dielectric layer being between 30 nm and 150 nm and the composition formula of the first thin film dielectric layer being represented by $Ba_{1-x}Sr_xTiO_3$ ($0.6 < x \leq 0.8$).

2. The variable capacitance capacitor element of claim 1, wherein the first thin film dielectric layer comprises one or more of Mn and Nb as additives.

3. The variable capacitance capacitor element of claim 1 further comprising:
   a third electrode layer provided opposite to the first electrode layer; and
   a second thin film dielectric layer positioned between the first and the third electrode layers,
   wherein a main component of the second thin film dielectric layer is represented by a composition formula $Ba_{1-x}Sr_xTiO_3$ ($0.6 < x \leq 0.8$) and
   wherein the second thin film dielectric layer has a thickness of from 30 nm to 150 nm.

4. A resonance circuit comprising:
   an antenna circuit including an antenna coil; and
   the variable capacitance capacitor element of claim 1 electrically connected to the antenna circuit.

5. A variable capacitance capacitor element comprising:
   a supporting substrate;
   a first electrode layer provided on the supporting substrate;
   a second electrode layer provided opposite to the first electrode layer; and
   a first thin film dielectric layer positioned between the first and second electrode layers,
   wherein a main component of the first thin film dielectric layer is represented by a composition formula $Ba_{1-x}Sr_xTiO_3$ ($0.6 < x \leq 0.8$),
   wherein the first thin film dielectric layer has a thickness from 30 nm to 150 nm, and
   wherein a value of x in the composition formula $Ba_{1-x}Sr_xTiO_3$ ($0.6 < x \leq 0.8$) of the main component of the first thin film dielectric layer and the thickness of the first thin film dielectric layer are each selected such that, upon application of a DC bias voltage of 3 Volts, an electric field strength in the variable capacitance capacitor element is 1.0 MV/cm or lower and that, when the DC bias voltage is continuously applied to the variable capacitance capacitor element for a predetermined amount of time, a variation rate of capacitance of the variable capacitance capacitor element is 4% or lower.

* * * * *

UNITED STATES PATENT AND TRADEMARK OFFICE
CERTIFICATE OF CORRECTION

PATENT NO. : 9,728,340 B2
APPLICATION NO. : 13/915117
DATED : August 8, 2017
INVENTOR(S) : Daiki Ishii et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 125 days.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*